No. 741,928. PATENTED OCT. 20, 1903.
C. RAYBURN.
APPARATUS FOR SORTING AND DISTRIBUTING FRUIT.
APPLICATION FILED DEC. 18, 1902.
NO MODEL. 2 SHEETS—SHEET 1.

No. 741,928. Patented October 20, 1903.

UNITED STATES PATENT OFFICE.

CHARLES RAYBURN, OF LINDSAY, CALIFORNIA.

APPARATUS FOR SORTING AND DISTRIBUTING FRUIT.

SPECIFICATION forming part of Letters Patent No. 741,928, dated October 20, 1903.

Application filed December 18, 1902. Serial No. 135,725. (No model.)

*To all whom it may concern:*

Be it known that I, CHARLES RAYBURN, a citizen of the United States, residing at Lindsay, county of Tulare, State of California, have invented an Improvement in Apparatus for Sorting and Distributing Fruit; and I hereby declare the following to be a full, clear, and exact description of the same.

My invention relates to an improved means for distributing fruit from the grading-machine to the packers.

In the preparation of fruit, such as oranges, for the market, the oranges are run through a grading-machine and sorted according to standard sizes. The assorted fruit is then packed into boxes ready for shipment. Many of these machines are capable of handling several car-loads of fruit in a day; but the output is hampered often for lack of floor-space to accommodate the packers or from the inherent incapability of the means at hand to distribute the fruit in such manner that sufficient packers can be employed.

The object of my invention is to provide suitable means for the rapid handling of the assorted fruit by affording accommodation for a greater number of packers than it has heretofore been generally possible to employ, at the same time economizing floor-space.

It consists of the parts and the construction and combination of parts hereinafter more fully described, having reference to the accompanying drawings, in which—

Figure 1:
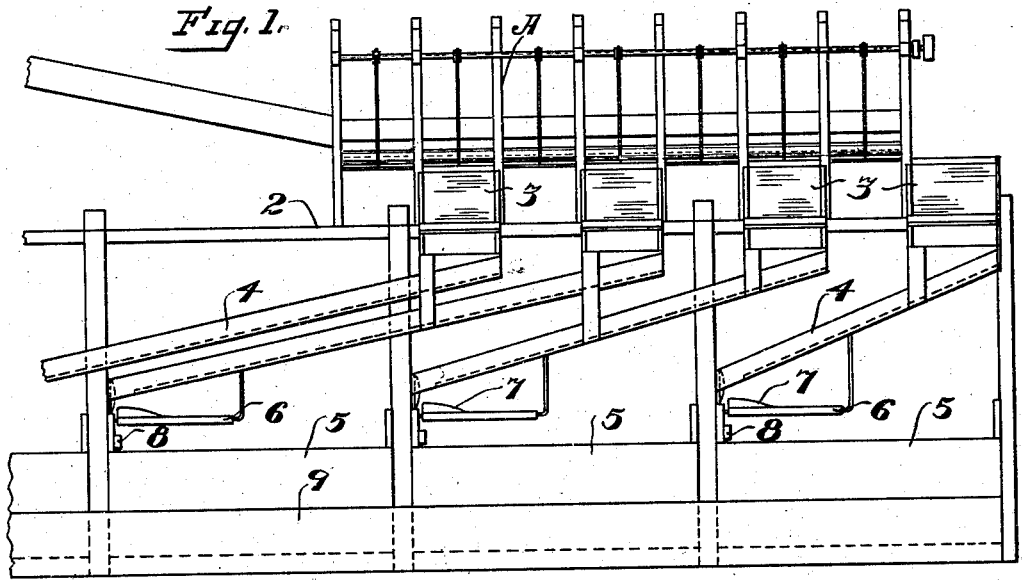
Figure 2:
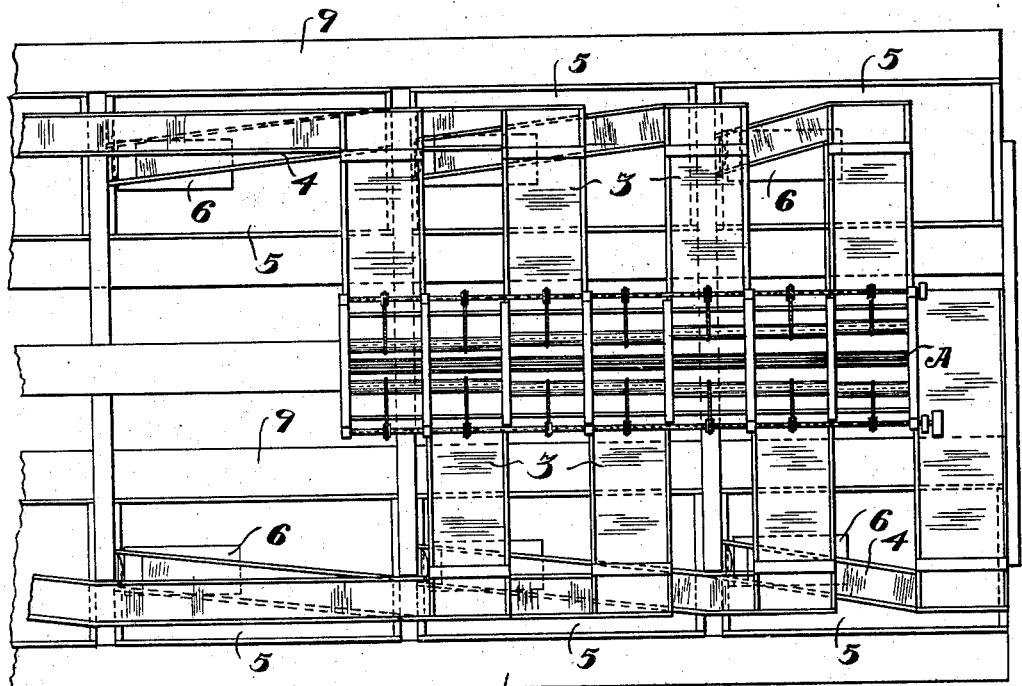
Figure 3:
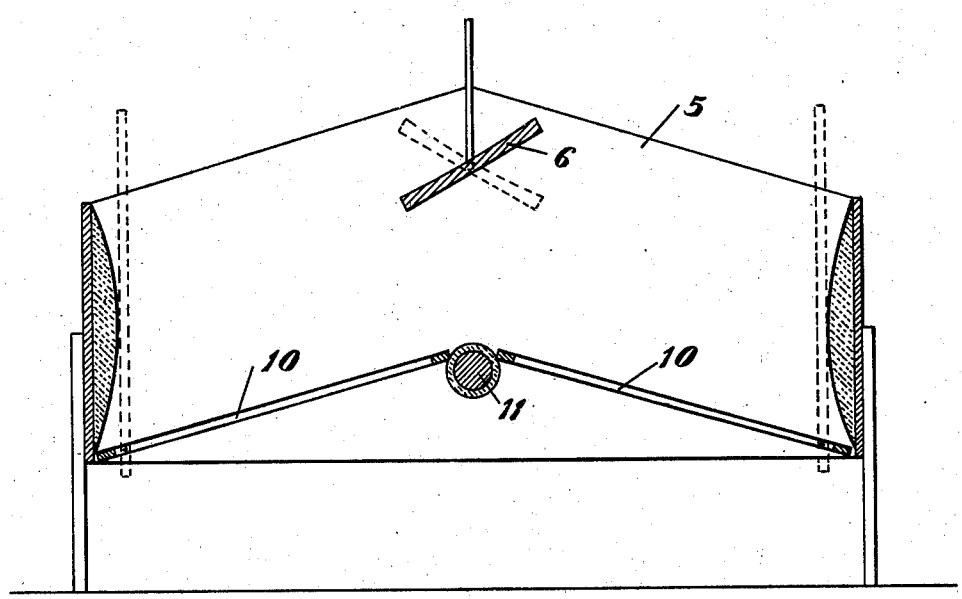
Figure 4:
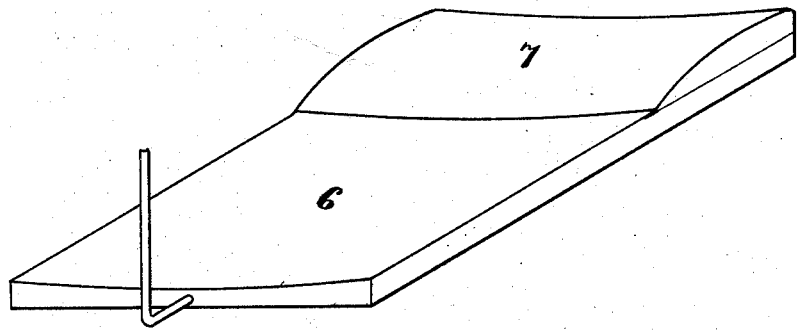

Figure 1 is a perspective view of my apparatus. Fig. 2 is a transverse section of same. Fig. 3 is a transverse section of bin. Fig. 4 is a perspective view of tilting board.

A represents a suitable grader or sizer supported upon a platform 2, situated at a convenient height above the floor, so that a man may easily move about beneath it. The assorted oranges pass according to their respective grades into troughs 3, leading outwardly from each side of the grader to the edge of the platform. Each of the troughs 3 discharges into a second trough 4, running at right angles to troughs 3, whence the fruit is delivered into their respective bins 5. The troughs are all lined with canvas or like suitable material to afford a proper resilient surface over which the oranges may roll without injury. Just below the discharge end of each trough 4 and extending parallel therewith is a tilting inclined board 6, slightly concaved, by which the fruit is delivered to either one side or the other of the bin. The head or upper end of the board onto which the fruit is first received is provided with a pillow or pad 7, as shown, to deaden the fall of the fruit. The board is suitably journaled at its ends, so as readily to be tilted to one side or the other, a cleat 8 limiting the movement of the board about its pivots.

When one side of a bin is filled sufficiently, its board is turned to deflect the fruit to the other side.

The bins are disposed in line beneath the boards and extend parallel with the axis of the grader A and on either side thereof. Their size depends on the output of the machine. They are each adapted to accommodate one or more packers on either side, the packers working at suitable tables 9, those on one side of the bins standing beneath the platform. Thus it is seen that I may very materially increase the output of a single machine by disposing the platform and providing the apparatus described whereby four rows of packers may be accommodated, whereas without such construction the output would be reduced, owing to inability to provide standing room for the packers. As it is now I am able to increase the number of packers without unduly lengthening the bins as would be the case if only access could be had to them at one side or if there were bins only on one side of the grader.

The bottoms of the bins slope from the center to the padded sides. Preferably these bottoms are each made in two sections 10, of canvas stretched over frames, which are hinged to the sides of a bin and ordinarily rest on a padded ridge-pole 11, disposed centrally beneath the deflector 6. The ends of the frames are supported on suitable cleats secured to the ends of the bin.

The object of forming the bottoms in movable sections is to allow of their being turned up edgewise during the idle season and prevent the collection of dust and to enable the workmen to get at the bins readily in order to clean them out at any time.

Having thus described my invention, what I claim, and desire to secure by Letters Patent, is—

1. The combination with a fruit-grader having an inclined lateral discharge-conveyer, of a bin having a central longitudinal ridge-pole with oppositely-inclined bottom sections, said ridge-pole disposed essentially in a plane parallel with the discharge of said conveyer, whereby discharge into the bin may take place equally on each side of the bin and without injury to the fruit, and box-supports upon each side of said bin.

2. In a device of the class described a receiving-bin having a padded ridge-pole along its longitudinal center, in combination with oppositely-inclined hinged sections forming the bottom of the bins and having their inner sides normally resting upon the ridge-pole.

3. In a machine of the character described, the combination with bins having the oppositely-inclined bottoms, of a tilting inclined board mounted above the apex of the bottoms and having a transversely-concaved upper surface, and means limiting the movement of the board about its axis.

4. In a machine of the character described, the combination with bins having the oppositely-inclined bottoms, of a tilting inclined board mounted above the apex of the bottoms, and transversely concaved and provided with a pillow or pad at its head, and a cleat below the board and limiting the tilting movement of the same.

5. In a machine of the character described, the combination of a bin having a bottom composed of frames and a fabric covering stretched over the same, said frames pivoted at opposite sides of the bin, and a ridge-pole or rest centrally located between the frames and adapted to support the free ends thereof said frames capable of being turned up edgewise to give access to the bins for cleansing purposes and to prevent the collection of dust.

6. In a machine of the character described, the combination of a bin having padded sides and a bottom composed of oppositely-inclined frames and a fabric covering therefor, said frames pivoted at opposite sides of the bin, and a padded ridge-pole centrally placed between the frames and adapted to support the free ends thereof, said frame capable of being turned up edgewise to give access to the bins for cleansing purposes and to prevent the collection of dust.

In witness whereof I have hereunto set my hand.

CHAS. RAYBURN.

Witnesses:
W. A. FINLEY,
E. A. McCORD.